United States Patent [19]

Satoh et al.

[11] Patent Number: 4,970,668

[45] Date of Patent: Nov. 13, 1990

[54] CRANK ANGLE SENSOR SIGNAL PROCESSOR

[75] Inventors: Hiroshi Satoh, Palo Alto, Calif.; Masahiro Iriyama, Yokosuka, Japan

[73] Assignee: Nissan Motor Company, Limited, Yokohama, Japan

[21] Appl. No.: 225,392

[22] Filed: Jul. 28, 1988

[30] Foreign Application Priority Data

Sep. 22, 1987 [JP] Japan ............................ 62-237614

[51] Int. Cl.$^5$ ............................................ G05B 15/00
[52] U.S. Cl. .............................. 364/559; 364/431.04; 123/414
[58] Field of Search ........... 364/559, 569, 574, 431.01, 364/431.03, 431.04, 431.05; 123/414, 416, 417, 419, 617, 613

[56] References Cited

U.S. PATENT DOCUMENTS

| | | | |
|---|---|---|---|
| 4,177,516 | 12/1979 | Mason ............................ | 364/431.03 |
| 4,429,365 | 1/1984 | Tuckman et al. .............. | 364/431.03 |
| 4,547,852 | 10/1985 | Kamifuji et al. ............... | 123/417 |
| 4,558,417 | 12/1985 | Akiyama et al. ............... | 123/417 |
| 4,745,554 | 5/1988 | Tomozawa et al. ............ | 364/569 |
| 4,797,828 | 1/1989 | Suzuki et al. .................. | 364/431.04 |
| 4,819,173 | 4/1989 | Brauninger ..................... | 364/431.11 |

*Primary Examiner*—Parshotam S. Lall
*Assistant Examiner*—Michael Zanelli
*Attorney, Agent, or Firm*—Foley & Lardner, Schwartz, Jeffery, Schwaab, Mack, Blumenthal & Evans

[57] ABSTRACT

In a crank angle sensor signal processor including a microcomputer, the number of generated unit crank angle (1°) signals are counted and compared with a predetermined level. An interrupt demand signal is generated in response to a reference signal only when the number of generated unit signals exceeds the predetermined level in order to minimize the effects of noise on the reference signal. The reference signal is expected to be inputted to the processor immediately after the number of generated unit sensor signals exceeds the predetermined level.

2 Claims, 5 Drawing Sheets

CRANK ANGLE SENSOR SIGNAL PROCESSOR

BACKGROUND OF THE INVENTION

1. Field of the Invention

The present invention relates to a crank angle sensor signal processor, and more specifically to a crank angle sensor signal processor for an engine, which is resistant against noise.

2. Description of the Prior Art

Recently, an engine is usually controlled by a microcomputer, and various sensors for detecting engine operating conditions are connected to the microcomputer. A crank angle sensor is one of the important sensors connected to a microcomputer control system. The crank angle sensor generates a reference crank angle signal (e.g. 120° signal in the case of a six-cylinder engine) and a unit crank angle signal (e.g. 1° signal) in order to control ignition timings of an engine, for instance, as is well known.

In controlling ignition timings of an engine, an actuator (e.g. switching power transistor) is turned off, for instance, in response to an ignition timing signal generated from a microcomputer to cut off the primary current of an ignition coil, so that the engine is sparked. In practice, the switching power transistor is turned off for ignition when the crank angle reaches a predetermined angular position (i.e. at ignition timing) previously stored in a memory unit of the microcomputer. The crank angular positions can be determined on the basis of the 120° signal and the 1° signal in the case of a six-cylinder engine.

An assumption is made that ignition timing data under some engine operating conditions is 40 degrees in advance of the top dead center. In usual, the 120° signal is generated at a crank angular position 70 degrees in advance of the top dead center. In response to this 120° signal, control begins to count the number of the 1° signals. Therefore, after the 1° signals have been counted 30 times and immediately after the 31st 1° signal has been inputted, the switching power transistor is turned off to ignite the engine cylinder at a crank angular position 40 degrees in advance of the top dead center.

In practice, however, the reference crank angle signal (REF signal) indicative of a reference crank angular position for ignition timing control is generated at an angular position 4 degrees in retard of the 120° signal (i.e. 66 degrees in advance of the top dead center, as shown in FIG. 1A.

In response to this reference crank angle signal (REF SIG), control generates an interrupt demand signal to execute an ignition. In the following description, however, the 120° signal is assumed to be the REF signal without distinguishing these two signals for simplification.

In the prior-art crank angle sensor signal processor, however, there exists a problem in that high frequency noise is easily superposed upon the REF signal (180° signal in the case of 4-cylinders; 120° signal in the case of 6-cylinders) through the sensor wire. When the noise level exceeds a predetermined level, an interrupt signal generator erroneously recognizes noise as the REF signal and therefore generates an interrupt demand signal to the controller (CPU of the microcomputer) for ignition.

As a result, the switching power transistor is turned off erroneously to generate an ignition pulse in spite of non-ignition timing, thus deteriorating engine performance momentarily.

To overcome the above-mentioned problem, it may be possible to incorporate noise eliminating hardware in an interface between the sensor and the microcomputer. However, the additional hardware will increase the cost of the crank angle sensor signal processor.

SUMMARY OF THE PRESENT INVENTION

With these problems in mind, therefore, it is the primary object of the present invention to provide a crank angle sensor signal processor resistant against high-frequency noise.

To achieve the above-mentioned object, the present invention includes (a) reference signal generating means for generating a reference crank angle sensor signal; (b) interrupt signal generating means, coupled to said reference signal generating means, for generating an interrupt demand signal in response to the reference crank angle sensor signal; (c) unit signal generating means for generating a unit crank angle sensor signal; (d) counting means, coupled to said unit signal generating means, for counting the number of the generated unit crank angle sensor signals; (e) comparing means, coupled to said counting means, for comparing the counted number with a predetermined level and outputting an interrupt timing signal when the counted number exceeds a predetermined level; (f) disabling means, coupled to said comparing means and said interrupt signal generating means, for disabling said interrupt signal generating means in response to no interrupt timing signal but enabling said interrupt signal generating means in response to the interrupt timing signal; and (g) clearing means, coupled to said counting means and said comparing means, for clearing said counting means in response to the interrupt timing signal.

In the sensor signal processor according to the present invention, even if noise is superposed upon the reference signal input line between the two reference signals, since the count level does not yet reach a predetermined level, an interrupt timing signal is not generated and therefore an interrupt demand signal is disabled. On the other hand, since an interrupt timing signal is generated, only after the number of generated unit signals exceeds the predetermined level, to enable an interrupt demand signal, it is possible to protect the sensor processor from external noise and therefore to improve the reliability of the sensor signal processor.

Further, in the case of the sensor processor having a microcomputer, the above additional function can be implemented by means of software without providing additional hardware.

DESCRIPTION OF THE PREFERRED EMBODIMENTS

Figure 2:
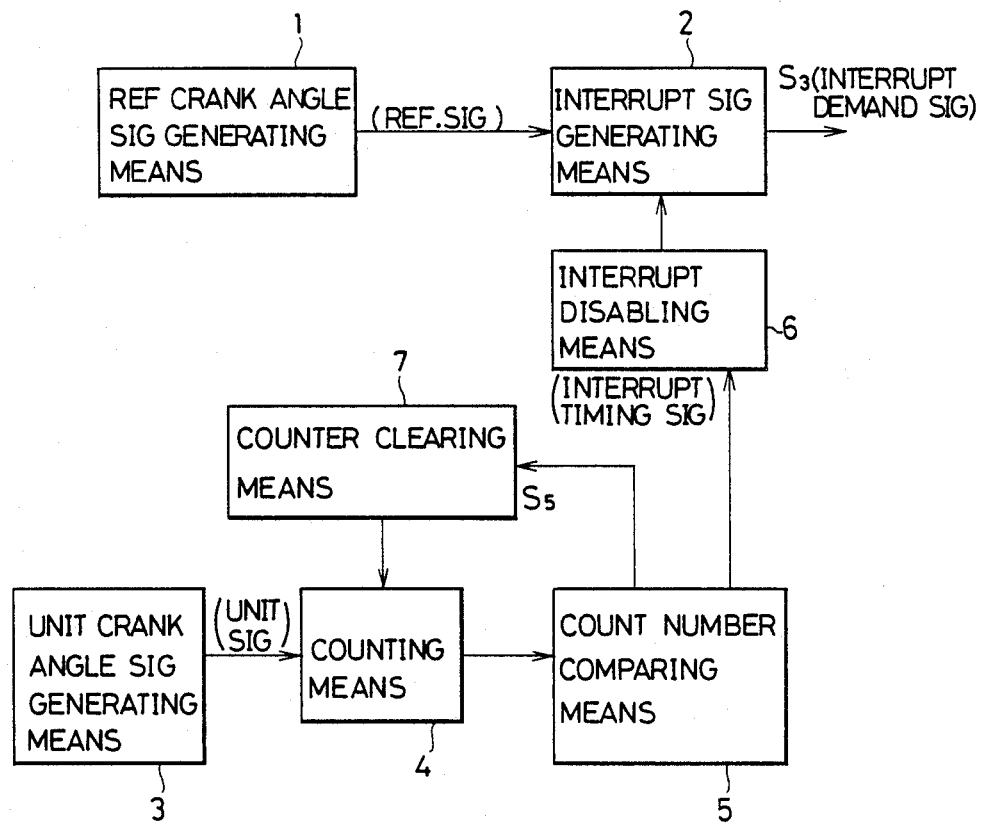
FIG. 2 is a block diagram showing a basic configuration of the sensor signal processor of the present invention.

FIG. 2 shows a basic configuration of a crank angle sensor signal processor according to the present invention. The processor comprises reference signal generating means 1 for generating a reference crank angle sensor signal; interrupt signal generating means 2, coupled to said reference signal generating means 1, for generating an interrupt demand signal in response to the reference crank angle sensor signal; unit signal generating means 3 for generating a unit crank angle sensor signal; counting means 4, coupled to said unit signal generating means 3, for counting the number of the generated unit crank angle sensor signals; comparing means 5, coupled to said counting means 4, for comparing the counted number of the unit crank angle sensor signals with a predetermined level and outputting an interrupt timing signal when the counted number exceeds a predetermined level; disabling means 6, coupled to said comparing means 5 and said interrupt signal generating means 2, for disabling said interrupt signal generating means 2 in response to no interrupt timing signal but enabling said interrupt signal generating means 2 in response to the interrupt timing signal; and clearing means 7, coupled to said counting means 4 and said comparing means 5, for clearing said counting means in response to the interrupt timing signal.

In the sensor signal processor, high-frequency noise is readily superposed upon the reference signal line, so that there exists a problem in that an interrupt demand signal is erroneously generated from the interrupt signal generating means 2. In the processor shown in FIG. 2, however, even if noise is generated between the two reference signals, since the count does not reach a predetermined level, the interrupt disabling means 6 generates no interrupt timing signal and therefore the interrupt signal generating means 2 is disabled, thus improving the reliability of the sensor signal processor, without additionally requiring hardware or increasing the cost thereof. The above operation is based upon the fact that the reference signal is expected to be inputted to the processor immediately after the number of the generated unit sensor signals exceeds the predetermined level.

Figure 3A:
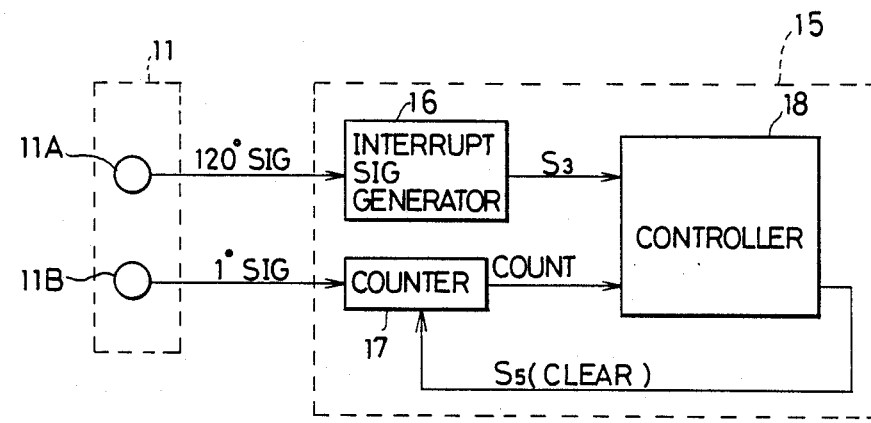
FIG. 3A is a block diagram showing a first embodiment of the sensor signal processor according to the present invention.

FIG. 3A is a block diagram showing a first embodiment of the present invention. In the drawing, the sensor signal processor comprises a crank angle sensor 11 and a microcomputer 15 including various functions as an interrupt signal generator 16, a counter 17 and a controller 18.

The crank angle sensor 11 comprises a 120° signal generator 11A for generating a 120° crank angle sensor signal as a reference crank angle sensor signal (which corresponds to the reference crank angle signal generating means 1) and a 1° signal generator 11B for generating 1° crank angle sensor signals as unit crank angle sensor signals (which corresponds to the unit crank angle signal generating means 3). This crank angle sensor 11 is of well-known type such as a rotary plate sensor composed of a rotary plate and an electromagnetic pickup, an electromagnetic sensor including a distributer, a photoelectric pickup composed of a pair of diodes (a light emitting element and a light receiving element) and a signal generating rotary plate, etc. Therefore, the sensors 11A and 11B correspond to an electromagnetic pickup or a light receiving diode, respectively.

An interrupt signal generator 16 generates an interrupt demand signal $S_3$ in response to the 120° signal generated by the 120° signal generator 11A. This generator 16 corresponds substantially to the interrupt signal generating means 2. When noise is superposed upon the 120° signal, this generator 16 generates an interrupt demand signal $S_3$ in response to the superposed noise. However, a controller 18 (which corresponds to the count number comparing means 5, the interrupt disabling means 6, and the counter clearing means 7) disables the generation of an interrupt signal.

Figure 1A:
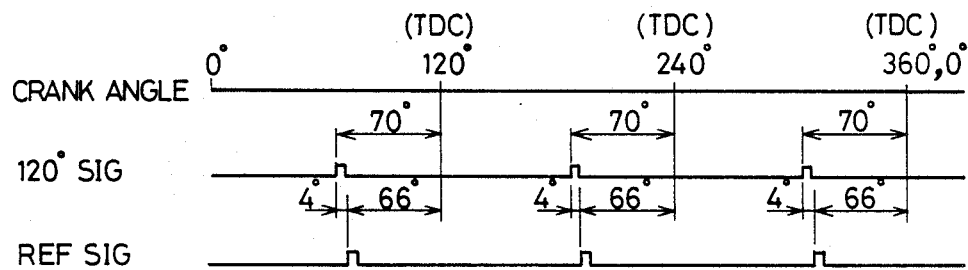
FIG. 1A is a timing chart for assistance in explaining crank angle sensor signals inputted to a prior-art sensor signal processor.
Figure 1B:
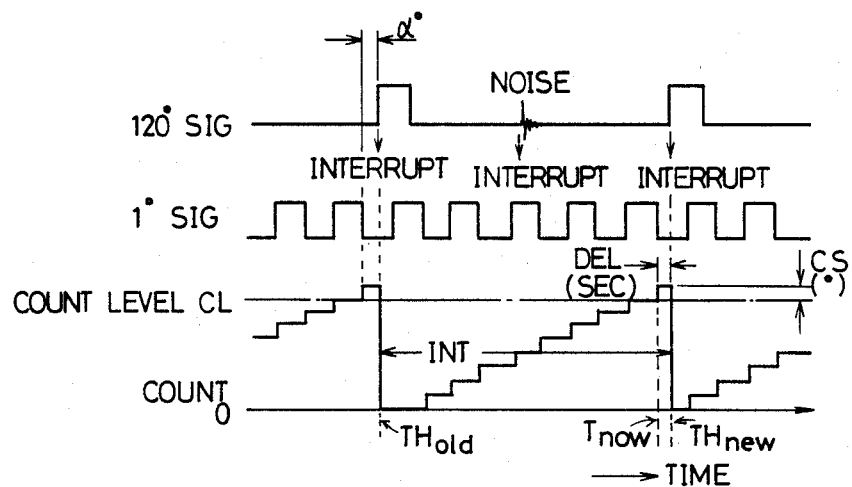
FIG. 1B is a timing chart for assistance in explaining various signals of a sensor signal processor according to the present invention.

In more detail, the counter 17 counts the number of 1° signals. The controller 18 compares the counted value COUNT with a predetermined count level CL and generates a counter clear signal $S_5$ to the counter 17 to clear the counter 17 when the counted value COUNT exceeds the count level CL. As shown in FIG. 1B, this count level CL is determined in such a way that the counted value COUNT exceeds the count level CL a predetermined time $\alpha$ (sec) ahead of the leading edge of each 120° signal. In response to this interrupt timing signal, the controller 18 enables the generation of an interrupt demand signal.

In summary, the controller 18 generates an interrupt signal only when the 120° signal rises a short time period after the counted value COUNT has exceeded the count level CL. Further, in response to this interrupt signal, control is interrupted for implementing ignition control, fuel injection control, etc.

In contrast with this, when high-frequency noise is superposed upon the 120° signal and therefore the interrupt signal generator 16 generates an interrupt demand signal in spite of the fact that the counted value COUNT does not exceed the predetermined count level CL, the controller determines that the interrupt demand signal is generated due to noise, and therefore the interrupt demand signal is disabled by the controller 18.

The above-mentioned function can be implemented by use of software, because a microcomputer is incorporated in the sensor signal processor, without hardware.

Figure 3B:
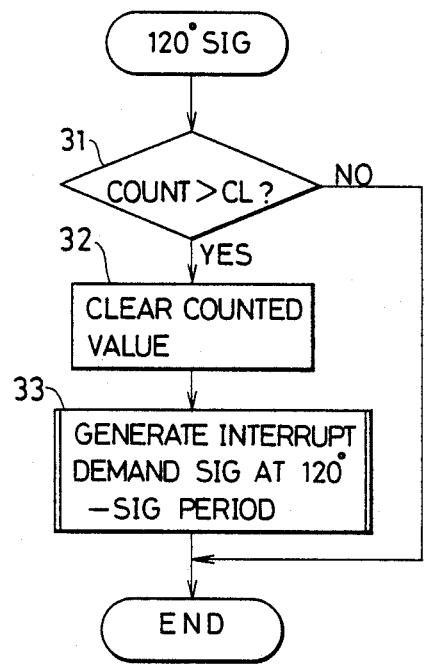
FIG. 3B is a flowchart for assistance in explaining the operation of the first embodiment shown in FIG. 3A.

FIG. 3B shows a flowchart showing the operation of the controller 18 in accordance with a program.

Control first checks whether the counted value COUNT exceeds a predetermined count value CL (in step 31). If YES, since this indicates that the angular position reaches an allowable range in which the reference signal is expected to be inputted to the processor, control clears the counted value COUNT (in step 32) and then enables the generation of an interrupt demand signal. The above operation is repeated at each period of the 120° signal (in step 33). Further, in step 1, if NO, since this indicates that the angular position does not reach an allowable range, control ends without generating any interrupt demand signal.

Figure 4A:
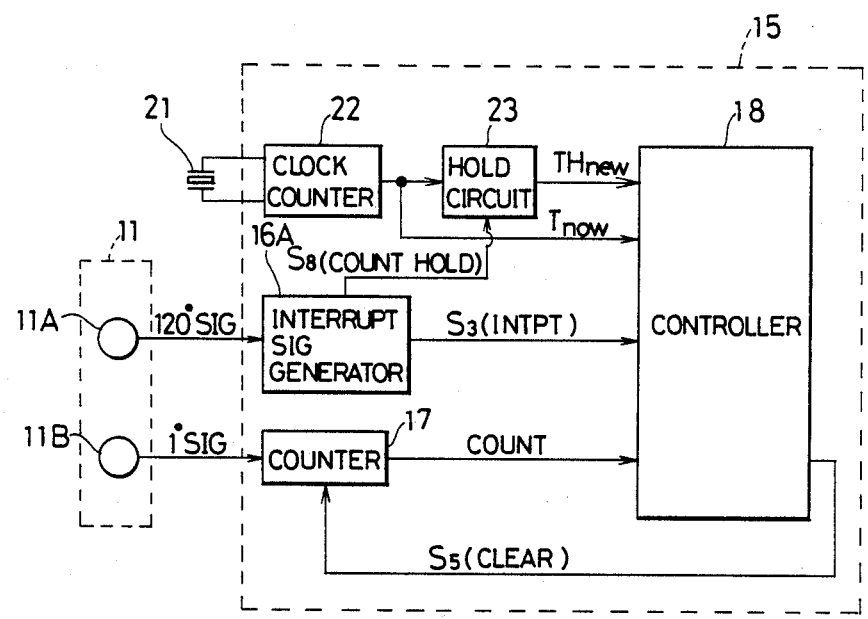
FIG. 4A is a block diagram showing a second embodiment of the sensor signal processor according to the present invention.
Figure 4B:
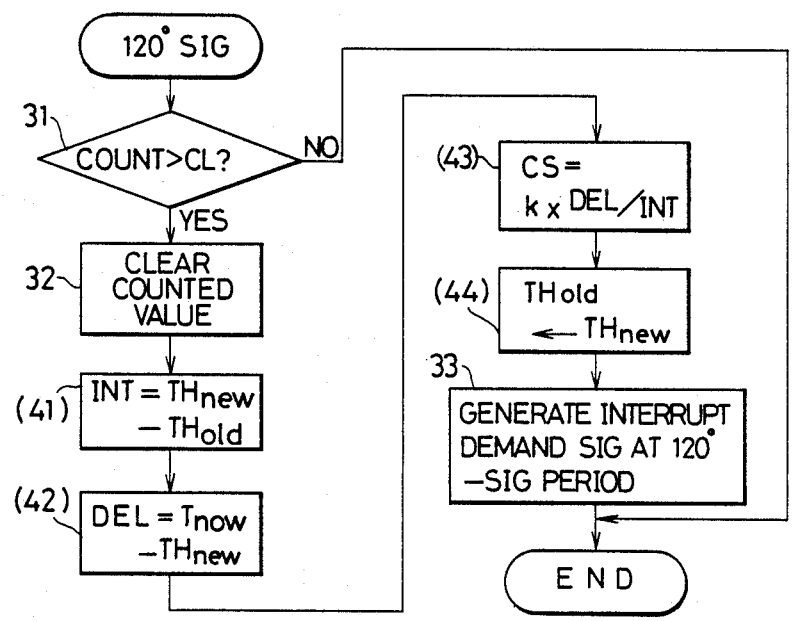
FIG. 4B is a flowchart for assistance in explaining the operation of the second embodiment shown in FIG. 4A.

FIGS. 4A and 4B show a second embodiment of the sensor signal processor of the present invention, in which a time delay DEL between the interrupt demand signal generation time point and the actual interrupt execution time point is taken into account. This delay time DEL can be omitted when the crank revolution speed is low, because the crank angle rotated through during this delay time is small. However, this delay time DEL cannot be disregarded when the crank revolution speed is high, because the crank angle rotated through during this delay time is large.

On the other hand, when ignition timings are controlled on the basis of the 120° signal, it is necessary to turn off the switching power transistor under consideration of this delay time, that is, a predetermined advance angle ahead of the basic ignition timing angle.

That is, in the sensor signal processor, it is necessary to freely adjust the timing when the interrupt timing signal is generated. For this purpose, in this embodiment, the predetermined count level is adjusted according to the delay time.

In this second embodiment, a delay time DEL to be advanced is converted into an advance angle CS and thereafter the predetermined counter level CL is lowered to generate the interrupt timing signal earlier to compensate for the delay of interrupt timing signal generation.

With reference to FIGS. 4A and 4B, after the counted value COUNT has been cleared (in step 32), control calculates a period (time interval) INT of the 120° signal (in step 41). This period is a time difference between the current interrupt demand signal generation time TH$_{new}$ and the preceding interrupt demand signal generation time TH$_{old}$. This time interval (INT=TH$_{new}$−TH$_{old}$) can be counted by counting clock pulses generated from a clock pulse generator (quartz oscillator) 21 with a clock pulse counter 22. In more detail, a hold circuit 23 connected to the clock pulse counter 22 is activated in response to the preceding clock pulse holding signal S$_8$ (at TH$_{old}$) generated from the interrupt signal generator 16A (simultaneously with the 120° signal S$_3$) and reactivated in response to the current clock pulse holding signal S$_8$ (at TH$_{new}$) to measure the time interval INT on the basis of the clock pulses (in step 41).

Here, an assumption is made that a delay time DEL (sec) of the signal processor is a time interval between when the counted value COUNT of the 1° signal exceeds the predetermined count level CL (at T$_{now}$) and when the interrupt demand signal is generated (at TH$_{new}$). Control counts this delay time DEL (sec) by counting the clock pulse signals from when the COUNT exceeds the CL to when the current interrupt demand signal is generated (at TH$_{new}$) (in step 42). Without being limited to the above delay time DEL, it is possible to determine any desired delay time DEL (sec).

Under these conditions, it is necessary to convert the delay time DEL (sec) into an advance angle CS (degrees). For this purpose, control calculates the CS as:

$$CS = K \times DEL/INT$$

where K denotes the number of the 1° signals applied between two adjacent 120° signals. The counted level CL is lowered by the calculated value CS (degrees) to advance the generation of the interrupt demand signal (in step 43). Thereafter, control replaces the preceding interrupt demand generation time TH$_{old}$ with the current interrupt demand generation time TH$_{new}$ (in step 44), and generates interrupt timing signals in advance of CS (degrees) before the current interrupt demand generation time TH$_{new}$ at each 120° signal period (in step 33). The other steps 31, 32 and 33 are the same as in the first embodiment shown in FIG. 3B.

Figure 5A:
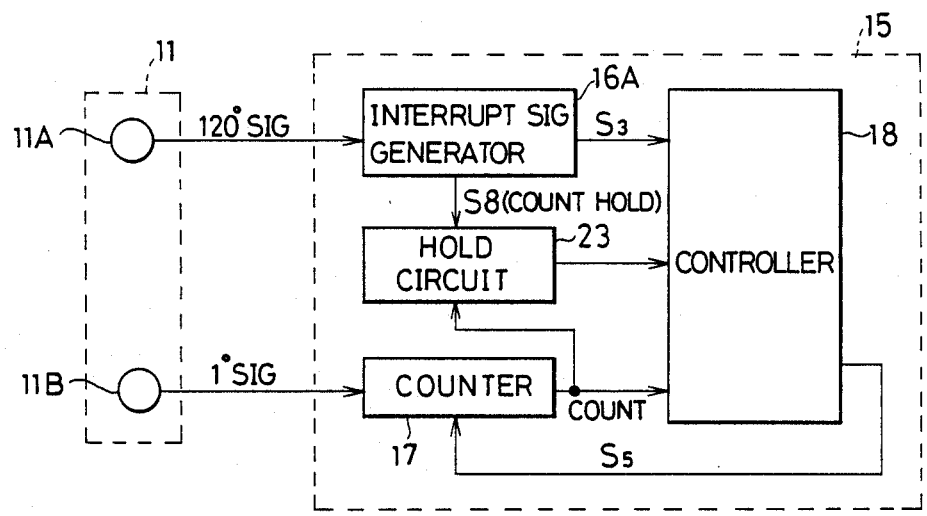
FIG. 5A is a block diagram showing a third embodiment of the sensor signal processor according to the present invention.
Figure 5B:
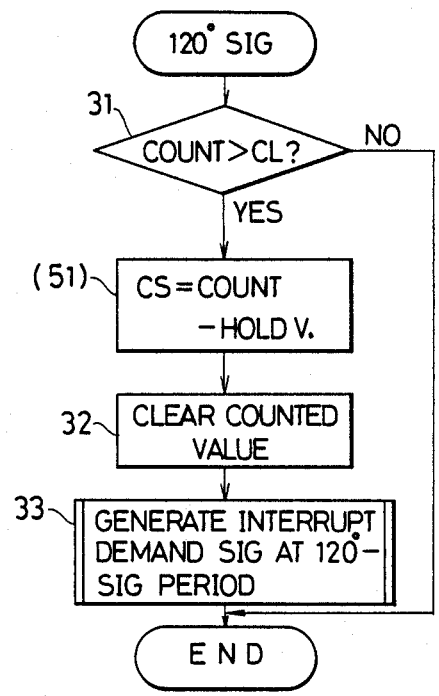
FIG. 5B is a flowchart for assistance in explaining the operation of the third embodiment shown in FIG. 5A.

FIGS. 5A and 5B show a third embodiment of the present invention, by which it is possible to delay the generation time of the interrupt demand signal. In this embodiment, the hold circuit 23 holds the counted value COUNT generated from the counter 17 in response to the holding signal S$_8$ generated from the interrupt signal generator 16A for a predetermined time period in order to obtain a delay angle CS (degrees) as CS=COUNT−HOLD . VALUE (in step 51). After the counted value COUNT has been delayed, the counter 17 is cleared as in the first embodiment (in step 32). The other steps 31, 32 and 33 are the same as in the first embodiment shown in FIG. 3B.

The above-embodiments have been described of a six-cylinder engine. Without being limited, however, the present invention can be applied to various engines and additionally to various sensor signal processors for automotive vehicles.

What is claimed is:

1. A crank angle sensor signal processor, comprising:
   (a) reference signal generating means for generating a reference crank angle sensor signal;
   (b) interrupt signal generating means, coupled to said reference signal generating means, for generating an interrupt demand signal in response to said reference crank angle sensor signal;
   (c) unit signal generating means for generating unit crank angle sensor signals;
   (d) counting means, coupled to said unit signal generating means, for counting a count number of generated unit crank angle sensor signals;
   (e) comparing means, coupled to said counting means, for comparing said count number with a predetermined level and for outputting an interrupt timing signal when said count number exceeds said predetermined level;
   (f) disabling means, coupled to said comparing means and to said interrupt signal generating means, for disabling said interrupt signal generating means in response to an absence of said interrupt timing signal and for enabling said interrupt signal generating means in response to said interrupt timing signal;
   (g) clearing means, coupled to said counting means and to said comparing means, for clearing said counting means in response to said interrupt timing signal; and
   (h) means for advancing a timing at which said comparing means outputs said interrupt timing signal, by reducing said predetermined level by a predetermined value determined according to a delay time.

2. A crank angle sensor signal processor, comprising:
   (a) reference signal generating means for generating a reference crank angle sensor signal;
   (b) interrupt signal generating means, coupled to said reference signal generating means, for generating an interrupt demand signal in response to said reference crank angle sensor signal;
   (c) unit signal generating means for generating unit crank angle sensor signals;

(d) counting means, coupled to said unit signal generating means, for counting a count number of generated unit crank angle sensor signals;
(e) comparing means, coupled to said counting means, for comparing said count number with a predetermined level and for outputting an interrupt timing signal when said count number exceeds said predetermined level;
(f) disabling means, coupled to said comparing means and to said interrupt signal generating means, for disabling said interrupt signal generating means in response to an absence of said interrupt timing signal and for enabling said interrupt signal generating means in response to said interrupt timing signal;
(g) clearing means, coupled to said counting means and to said comparing means, for clearing said counting means in response to said interrupt timing signal; and
(h) means for retarding a timing at which said comparing means outputs said interrupt timing signal by holding a counted value for a predetermined period.

* * * * *